United States Patent [19]

Stokes, Jr. et al.

[11] 3,858,319

[45] Jan. 7, 1975

[54] SOLDERING

[75] Inventors: John J. Stokes, Jr., Murrysville; Charles A. Benish, Tarentum, both of Pa.

[73] Assignee: Aluminum Company of America, Pittsburgh, Pa.

[22] Filed: Apr. 30, 1973

[21] Appl. No.: 355,756

[52] U.S. Cl. ............................... 29/496
[51] Int. Cl. ............................... B23k 31/02
[58] Field of Search ..................... 29/495, 496

[56] References Cited
UNITED STATES PATENTS

| | | | |
|---|---|---|---|
| 2,640,793 | 6/1953 | Doerr | 29/495 X |
| 2,781,577 | 2/1957 | Smellie | 29/495 X |
| 2,817,893 | 12/1957 | Cunningham et al | 29/495 X |
| 2,867,037 | 1/1959 | Lawton | 29/495 X |
| 3,008,230 | 11/1961 | Babcock et al | 29/495 |
| 3,066,405 | 12/1962 | Eichhorn et al | 29/495 |

*Primary Examiner*—Gerald A. Dost
*Attorney, Agent, or Firm*—Carl R. Lippert

[57] ABSTRACT

In soldering metal members, particularly aluminum members, chemical fluxes are employed to aid in the wetting of the parent members by the molten solder filler alloy. One such flux contains substantial amounts of zinc chloride and is mixed with volatile organic or non-aqueous solvents for use in soldering. This flux is also useful in coating metals with zinc by reaction between the metal and the flux. The stability of the flux prior to blending with the organic solvent is enhanced by forming a paste with a small amount of water.

22 Claims, No Drawings

SOLDERING

Background

In the soldering of metal members, and particularly aluminum members, it is known to employ a reactive chemical flux containing relatively high amounts of zinc chloride. One such flux contains, nominally, 90% zinc chloride, 8% ammonium chloride and 2% sodium fluoride. Other similar fluxes contain varying amounts of zinc chloride along with the fluorides and chlorides of the alkali metals, i.e., potassium, lithium or sodium, or of ammonium. To a lesser extent the chlorides of cadmium and calcium may be included. One reason these fluxes are very useful is that zinc chloride reacts with aluminum and other metals at soldering temperature to form the metal chloride and deposit a zinc or zinc alloy coating. Particularly where zinc forms the base of the solder filler alloy this results in the application of filler metal immediately on the cleanest possible surface. While this type of flux is very highly suited to joining aluminum with zinc base solder filler alloys, it is also useful in joining aluminum with lead or other base solders and in joining other metals with various filler metals, for instance joining steel with lead-tin type solders. The zinc chloride fluxes are normally mixed with a volatile non-aqueous solvent, usually an organic solvent, vehicle to form a slurry-like consistency which is applied to a joint site, the volatile organic material being easily volatilized from the joint site when heated.

A serious problem occurs in connection with zinc chloride based reactive fluxes because of the hygroscopic nature of zinc chloride in that it tends to combine with water and undergo recrystallization to become very caky and hence difficult to handle and use. Another problem associated with taking up moisture is that these fluxes can readily reach a point of about 17% moisture whereupon the potency of the flux is greatly impaired if not completely depleted. This has led to cumbersome precautions whereby the zinc chloride flux powders are meticulously maintained as dry as possible. Special shipping containers and handling procedures, some fairly intricate, are employed, but notwithstanding these measures the flux still tends to cake up and lose potency which hinders its usefulness.

STATEMENT OF THE INVENTION

In accordance with the present invention it has been found that the perplexing problems with respect to moisture in zinc chloride base reactive fluxes can be largely alleviated by actually adding to the dry powder a relatively small amount of water which is mixed with the powder to form an aqueous paste. That is, the flux is not provided as a dry powder but rather as a paste. This paste does not take up moisture any more rapidly than the dry powder and if anything, takes up moisture at a considerably lower rate. The advantages are completely dust-free conditions and improved ease in shipping, handling and using the flux and, more significantly, greatly enhanced stability of the flux in that it is completely cake-free and maintains stability and potency for longer periods of time than previously possible. In addition it can be shipped without the cumbersome precautions previously required to keep the flux perfectly dry. The flux in this form can be packaged in various types of containers without special attention to intricate moisture barriers. The container should, of course, be closed in order to keep the flux clean and away from access by very large amounts of moisture and humidity but the extent of the precautions is very much decreased over those previously required to keep the flux perfectly dry.

DETAILED DESCRIPTION

In forming the initial paste in accordance with the invention 4 to 12% water is included based on the weight of the paste mixture. That is, the paste contains 4 to 12% water, the balance, 88 to 96%, being the flux powder. A preferred range for water is 8 to 10% and an optimum level for many applications occurs at about 9% although water levels as high as 15 or even 16% can still be employed in practicing the invention. In providing the flux-water paste the salt flux, in particulate form, should be relatively homogeneous and preferably has a particle size of 270 to 325 mesh or finer. The paste is formed by tumbling or mixing or any other suitable means such as blending.

The zinc chloride based fluxes herein referred to contain at least 50%, preferably at least 70%, of zinc chloride, the balance being for the most part composed of the fluorides and chlorides of ammonium and the alkali metals together with the chlorides of cadmium and calcium. At room temperature these salts are all solids and more or less inactive, but when appropriately blended are molten at temperatures over 600° F which are those levels normally used in soldering. When heated, especially when molten, these fluxes are activated and become reactive to metal surfaces. More preferred fluxes contain at least 85% zinc chloride. One such flux which has attained relatively wide use contains about 88 to 92% zinc chloride, about 7 to 9% ammonium chloride and around 1 ½ to 2 ½% sodium fluoride. This flux has achieved widespread use as facilitating sound solder joints with aluminum members joined by a zinc based solder filler alloy such as substantially pure zinc or zinc alloyed with up to 10% aluminum, typically 5% aluminum, and up to 2% copper. Zinc chloride base fluxes also serve well when joining aluminum members by lead or other base solders and are even useful in joining metals other than aluminum but have obtained their widest acceptance in connection with joining aluminum. These fluxes are most useful at joining temperatures of between 675° or 680° F and 900° F or thereabout.

As stated earlier, according to prior art practices, zinc chloride based reactive fluxes in dry powder form are normally mixed with a volatile non-aqueous or organic solvent vehicle to form a slurry. The flux-vehicle slurry is normally flowable and of such consistency as may be desired or required for a particular joint configuration, thicker or more viscous mixtures being more suited to situations where the flux might be prone to fall from the work site. Suitable organic solvents include the lower molecular weight aliphatic alcohols such as methanol, ethanol, propanol and butanol. Also methyl-ethyl ketone and methyl-isobutyl ketone are useful but many users find propanol to be quite satisfactory. While the invention contemplates the use of these organic volatile solvents such is not necessarily intended to limit the invention which in a broader sense contemplates other non-aqueous solvents compatible with temperature, contamination, safety and other aspects of prudent practice.

In practicing the invention employing the flux paste formed with water in lieu of the dry flux powder, much the same factors apply with respect to the amount of non-aqueous or volatile organic solvent vehicle as apply with the dry powder. The major difference is that since there already is some amount of liquid present in the improved flux paste, less organic solvent vehicle may be used than might otherwise be employed for a given desired consistency. The total solids content for any given consistency thus remains relatively close to the situation where the dry flux is mixed with organic solvent. The previous levels featuring a solids content as low as 50%, the balance organic solvent, might still apply with respect to the solids content. The solids content, of course, refers to the zinc chloride base flux comprising salts which are solid at room temperature. As was the case previously, mixtures containing as little as 50% solids are not as useful as those containing higher amounts of 65 or 70% or up to 90% solids and even higher, the particular solids content, as already stated, depending on the desired consistency or viscosity of the flux-vehicle slurry.

The table below lists two examples of preferred water-flux paste formulations which are mixed with volatile organic solvents to provide preferred flux slurries for soldering.

| Initial Paste | | Slurry Mixture Parts Paste | Parts Organic | Slurry for Solder Use | | |
|---|---|---|---|---|---|---|
| Water | Solids | | | Composition of Slurry | | |
| | | | | Solids | Water | Organic Solvent |
| 12% | 88% | 4 | 1 | 70% | 10% | 20% |
| 9% | 91% | 9 | 3-½ | 65% | 6.5% | 28.5% |

The invention contemplates soldering procedures including dip, furnace, torch or other soldering operations which utilize reactive salt fluxes of the zinc chloride type. In soldering, the parts to be joined are first cleaned to remove grease which cleaning can be conveniently effected employing an organic solvent degreaser in accordance with the known practices. The joint components or parent members are then assembled into joining configuration to establish a joint site. By joining configuration is meant such configuration and proximity as to facilitate joining by a molten filler metal which bridges and forms a connection across and between the members. The zinc-chloride-organic solvent vehicle is then applied to the joint surfaces of the parent members at the joint site. The joint site is heated to joining temperature, which heating melts or at least activates the flux which reacts with joint surfaces in the manner described. Solder filler alloy is situated or provided at the joint site and melts and flows into the joint and forms a bridge or connection between the joint components or parent members. Cooling the assembly solidifies the solder filler alloy but, of course, does not melt the parent members being joined. As indicated earlier the use of zinc chloride fluxes is normally limited to processes where the joining temperature occurs between about 675° or 680° and 900° F and accordingly the present improvement is largely limited to such practices. In soldering aluminum this usually points to the zinc based solder alloy referred to earlier containing up to 10% aluminum, up to 2% copper, balance zinc.

When referring to soldering processes in this description it is intended to apply to those processes where the solder filler alloy is of a different composition or base than the parent members being joined and wherein the solder simply wets the surfaces of the parent members but does not fuse them or diffuse significantly into the surfaces. In joining aluminum this can be contrasted with welding where, of course, there is some fusion of the base or parent members and can be contrasted with brazing aluminum wherein the filler metal is of an aluminum base and a very significant amount of diffusion occurs between the filler metal and the parent material. When referring to compositions and proportions, percentages and parts are by weight.

While the invention is particularly suited to soldering processes involving the use of zinc chloride fluxes, it is also useful in other processes or treatments where a metal surface is reacted with a zinc chloride base reactive flux to provide a zinc or zinc alloy coating. For instance aluminum, steel, copper or other metal surfaces can be treated with a zinc chloride flux heated to molten form. The molten flux reacts with the metal surface to provide a zinc coating, the consumed zinc chloride being converted to the chloride salt of the metal treated. Thus in its broadest sense the improvement can be viewed as applicable to any process where a surface of a metal reactable with zinc chloride is treated with a zinc chloride base flux brought to activation temperature to zinc coat the surface by displacement of the zinc by the metal to change the reacted chloride to the chloride salt of the metal or of metals from the surface treated.

In another sense the invention contemplates joining without the supply of a separate solder filler alloy as such. Since treatment of an aluminum metal surface with a zinc chloride flux leaves the surface coated with zinc and since zinc is a solder filler alloy, the znc coating can provide the filler metal if the joint is properly designed. Thus the invention contemplates zinc coating as described and employing the coating as a filler metal. The coating and joining can be combined into a single operation if desired.

What is claimed is:

1. In the method of treating a metal surface wherein a reactive chemical flux containing at least 50% zinc chloride is mixed with a non-aqueous solvent vehicle to form a flux slurry which is applied to said surface and wherein the surface is heated to a sufficient temperature to volatilize said non-aqueous vehicle and activate said zinc chloride base flux to cause said flux to react with said metal surface to produce a zinc or zinc alloy coating thereon, the improvement wherein said zinc chloride based reactive flux is provided as an aqueous paste containing 4 to 15% water, the balance being substantially the zinc chloride based reactive flux.

2. In the method of joining metal members wherein a reactive chemical salt flux containing at least 50% zinc chloride is mixed with a volatile organic solvent vehicle to form a flux slurry which is applied to the joint site established where two or more members are brought into joining configuration and the joint site is heated to a temperature sufficient to activate said zinc chloride base flux and volatilize said vehicle and wherein molten solder filler alloy is provided at said joint site to wet the surfaces of the members at the joint site to form a connection therebetween after which the assembly is cooled to solidify the solder filler alloy and complete the joint, the improvement wherein said zinc chloride based reactive flux is provided as an aqueous paste containing 4 to 15% water, the balance being substantially the zinc chloride based reactive flux.

3. The improvement according to claim 2 wherein said aqueous flux paste contains 4 to 12% water.

4. The improvement according to claim 2 wherein said aqueous flux paste contains 8 to 10% water.

5. The improvement according to claim 2 wherein the flux slurry applied to the joint site contains at least 65% of said flux.

6. The improvement according to claim 2 wherein the parent members being joined include at least one member of aluminum or an alloy thereof.

7. The improvement according to claim 2 wherein the solder filler alloy is a zinc base metal.

8. The improvement according to claim 6 wherein the solder filler alloy is a zinc base metal containing up to 10% aluminum.

9. The improvement according to claim 6 wherein the solder filler alloy is a zinc base metal containing up to 10% aluminum and up to 2% copper.

10. The improvement according to claim 2 wherein said reactive chemical flux contains at least 70% of ZnCl, the balance including one or more of the fluorides and chlorides of ammonium and the alkali metals and the chlorides of cadmium, tin and calcium.

11. The improvement according to claim 2 wherein said reactive chemical flux contains at least 85% ZnCl, the balance including one or more of the fluorides and chlorides of ammonium and the alkali metals and the chlorides of cadmium, tin and calcium.

12. The improvement according to claim 2 wherein said reactive chemical flux contains about 88 to 92% ZnCl, about 7 to 9% NH$_4$Cl and about 1 ½ to 2 ½% NaF.

13. A method of soldering aluminum members to form a solder joint comprising the steps
  1. providing an aqueous paste of a solid particulate reactive chemical flux containing at least 70% zinc chloride, said paste containing 4 to 12% water, the balance being said reactive chemical flux,
  2. bringing the members into joining configuration at a joint site,
  3. blending said aqueous flux paste with a volatile organic solvent vehicle to provide a slurry containing at least 65% solids and applying said slurry to said joint site,
  4. providing solid zinc base solder filler metal at said joint site in such proximity as to be flowable into said joint site,
  5. heating said joint site to joining temperature to melt said solder filler alloy and said reactive flux, but not said aluminum member, and cause said filler alloy to wet and form a connection between joint surfaces of said members, and
  6. cooling said joint site to solidify said solder filler alloy.

14. The method according to claim 1 wherein the said zinc coating is provided on a joint surface of a metal member and that surface is contacted with another metal surface with said zinc coating in molten condition and solidifying the molten zinc.

15. In the method of joining metal members wherein a reactive chemical salt flux containing at least 50% zinc chloride is mixed with a volatile non-aqueous solvent vehicle to form a flux slurry which is applied to the joint site established where two or more members are brought into joining configuration and the joint site is heated to a temperature sufficient to activate said zinc chloride base flux and volatilize said vehicle and wherein molten solder filler alloy is provided at said joint site to wet the surfaces of the members at the joint site to form a connection therebetween after which the assembly is cooled to solidify the solder filler alloy and complete the joint, the improvement wherein said zinc chloride based reactive flux is provided as an aqueous paste containing 4 to 15% water, the balance being substantially the zinc chloride based reactive flux.

16. In the method according to claim 1 wherein said reactive flux is produced as said aqueous paste in a packaged commodity.

17. In the method according to claim 2 wherein said reactive flux is produced as said aqueous paste in a packaged commodity.

18. In the method of treating a metal surface wherein a reactive chemical flux containing at least 50% zinc chloride is mixed with a non-aqueous solvent vehicle to form a flux slurry which is applied to said surface and wherein the surface is heated to a sufficient temperature to volatilize said non-aqueous vehicle and activate said zinc chloride base flux to cause said flux to react with said metal surface to produce a zinc or zinc alloy coating thereon, the improvement wherein said zinc chloride based reactive flux is provided for mixture with said vehicle as a packaged product said product being an aqueous paste containing 4 to 15% water, the balance being substantially the zinc chloride based reactive flux.

19. In the method of joining metal members wherein a reactive chemical salt flux containing at least 50% zinc chloride is mixed with a volatile organic solvent vehicle to form a flux slurry which is applied to the joint site established where two or more members are brought into joining configuration and the joint site is heated to a temperature sufficient to activate said zinc chloride base flux and volatilize said vehicle and wherein molten solder filler alloy is provided at said joint site to wet the surfaces of the members at the joint site to form a connection therebetween after which the assembly is cooled to solidify the solder filler alloy and complete the joint, the improvement wherein said zinc chloride based reactive flux is provided for mixture with said vehicle as a packaged product said product being an aqueous paste containing 4 to 15% water, the balance being substantially the zinc chloride based reactive flux.

20. The improvement according to claim 19 wherein said aqueous flux paste contains 4 to 12% water.

21. The improvement according to claim 19 wherein said aqueous flux paste contains 8 to 10% water.

22. The improvement according to claim 19 wherein said reactive chemical flux contains at least 70% of ZnCl, the balance including one or more of the fluorides and chlorides of ammonium and the alkali metals and the chlorides of cadmium, tin and calcium.

* * * * *